(12) United States Patent
Liu et al.

(10) Patent No.: US 10,237,045 B2
(45) Date of Patent: Mar. 19, 2019

(54) METHOD FOR ALLOCATING A TRANSMISSION MODE TO A USER EQUIPMENT AND APPARATUS THEREOF

(75) Inventors: Jingxiu Liu, Beijing (CN); Xuegang Huang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 836 days.

(21) Appl. No.: 14/351,180

(22) PCT Filed: Oct. 14, 2011

(86) PCT No.: PCT/CN2011/080817
§ 371 (c)(1),
(2), (4) Date: Apr. 11, 2014

(87) PCT Pub. No.: WO2013/053135
PCT Pub. Date: Apr. 18, 2013

(65) Prior Publication Data
US 2014/0241307 A1  Aug. 28, 2014

(51) Int. Cl.
*H04B 7/06* (2006.01)
*H04B 7/08* (2006.01)
(Continued)

(52) U.S. Cl.
CPC .......... *H04L 5/006* (2013.01); *H04B 7/0617* (2013.01); *H04B 7/0619* (2013.01);
(Continued)

(58) Field of Classification Search
CPC ....................................................... H04L 5/00
(Continued)

(56) References Cited

U.S. PATENT DOCUMENTS

2004/0120411 A1*  6/2004  Walton ................. H04B 7/0417
                                                                  375/260
2005/0181811 A1*  8/2005  Magnusson ........... H04L 1/0026
                                                                  455/458
(Continued)

FOREIGN PATENT DOCUMENTS

CN          1717900 A       1/2006
CN        101640561 A       2/2010
(Continued)

OTHER PUBLICATIONS

Kovacs, Istvan Z., et al., "Performance of MIMO Aware RRM in Downlink OFDMA", IEEE 2008, pp. 1171-1175.
(Continued)

*Primary Examiner* — Brandon M Renner
*Assistant Examiner* — Abdeltif Ajid
(74) *Attorney, Agent, or Firm* — Harrington & Smith (57) ABSTRACT

It is described a method for allocating a transmission mode to a user equipment for a radio transmission within a cellular network between the user equipment and a base station, wherein the user equipment is adapted to communicate with the base station in the allocated transmission mode via a communication channel. The method includes determining, by the base station, an information being indicative for a quality of the communication channel, receiving, by the base station, a feedback information from the user equipment being indicative for the quality of the communication channel, determining a compensation value based on the information and the feedback information, wherein the compensation value is adapted for compensating a difference between the information and the feedback information, determining an adapted transmission mode for the user equipment based on the compensation value, and allocating the adapted transmission mode to the user equipment.

12 Claims, 2 Drawing Sheets

(51) Int. Cl.
*H04L 1/00* (2006.01)
*H04L 1/06* (2006.01)
*H04L 5/00* (2006.01)

(52) U.S. Cl.
CPC ......... *H04B 7/0689* (2013.01); *H04B 7/0871* (2013.01); *H04L 1/0015* (2013.01); *H04L 1/0026* (2013.01); *H04L 1/06* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2007/0115796 | A1* | 5/2007 | Jeong | H04L 1/0026 370/203 |
| 2008/0273490 | A1* | 11/2008 | Sayana | H04L 1/0003 370/329 |
| 2009/0310550 | A1* | 12/2009 | Medapalli | H04W 28/18 370/329 |
| 2010/0284454 | A1* | 11/2010 | Oteri | H03M 13/353 375/224 |
| 2013/0044664 | A1* | 2/2013 | Nory | H04L 1/0045 370/311 |

FOREIGN PATENT DOCUMENTS

| | | |
|---|---|---|
| CN | 101777965 A | 7/2010 |
| CN | 101789849 A | 7/2010 |
| CN | 101800628 A | 8/2010 |
| CN | 101867447 A | 10/2010 |
| WO | WO 2004038986 A2 | 5/2004 |

OTHER PUBLICATIONS

Wei, Na, et al., "Performance of Spatial Division Multiplexing MIMO with Frequency Domain Packet Scheduling: From Theory to Practice", IEEE Journal on Selected Areas in Communications, vol. 26, No. 6, Aug. 2008, pp. 890-900.

Oborina, Alexandra, et al., "MIMO Performance Evaluation in UTRAN Long Term Evolution Downlink", IEEE 2008, pp. 1179-1183.

* cited by examiner

METHOD FOR ALLOCATING A TRANSMISSION MODE TO A USER EQUIPMENT AND APPARATUS THEREOF

FIELD OF THE INVENTION

The present invention relates to the field of cellular communication networks and in particular to cellular communication networks supporting different transmissions for a user equipment.

BACKGROUND OF THE INVENTION

In 3GPP Rel. 8, several kinds of transmission modes are defined, i.e. TM1 to TM7, and also dual stream beamforming (TM8) is added in 3GPP Rel. 9. The different transmission modes are designed for user equipments (UEs) in different scenarios (channel condition, moving speed, etc) and different UE capabilities. Allocating a proper transmission mode to a proper UE is a challenging issue. For example, if allocating TM7 (beamforming) mode to a UE which is not suitable to do beamforming, then besides no beamforming gain is achieved, additional overhead of demodulation reference signals (DM-RS) may lead to a loss of overall spectrum efficiency.

In view of the above-described situation, there exists a need for an improved technique that provides a cellular communication system substantially avoiding or at least reducing one or more of the above-identified problems. Hence, a system or method being able to provide efficient and improved allocation of transmission modes to user equipments may be needed.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a method for allocating a transmission mode to a user equipment for a radio transmission within a cellular network between the user equipment and a base station. The user equipment is adapted to communicate with the base station in the allocated transmission mode via a communication channel. The method comprises determining, by the base station, an information being indicative for a quality of the communication channel, receiving, by the base station, a feedback information from the user equipment being indicative for the quality of the communication channel, determining a compensation value based on the information and the feedback information, wherein the compensation value is adapted for compensating a difference between the information and the feedback information, determining an adapted transmission mode for the user equipment based on the compensation value, and allocating the adapted transmission mode to the user equipment.

This aspect may relate in particular to the allocation of different kind of transmission modes to user equipments (UEs) having different capabilities. These capabilities may change over time, so that the proposed method may adapt the allocation when determining any changes.

Different transmission modes may be designed for UEs in different scenarios (channel condition, moving speed, etc) and different UE capabilities. According to common techniques, the following approaches may be used to allocate a transmission mode:

CQI (channel quality identifier) based criterion: when the CQI is smaller than a defined threshold, beamforming gain can help UE so TM7 is recommended; when the CQI is equal or greater than a defined threshold, multiple layer codebook-based precoding can achieve better spectrum efficiency by sending more than one data stream (TM7 can only support one stream);

Location based criterion: cell-edge UE will obtain most obvious performance enhancement from beamforming; however cell-center UEs who have already very high SINR (signal interference to noise ratio), the additional beamforming gain cannot be proportionally reflected into throughput based on Shannon theory.

Another factor which may impact the relationship between SINR/location and beamforming gain is the eNB antenna downtilting angle, which is used to adjust the tradeoff cell average performance and coverage. With the SON (self optimizing network) feature, antenna downtilting angle will also be used to adjust the inter-cell interference, so such angle may also change in time domain semi-statically or dynamically. A downtilting angle may adjust the direction of vertical beam, if the downtilting angle is large, then the vertical beam may more tend to cover the cell-middle or even cell-center UEs; if the downtilting angle is small, the vertical beam may give higher vertical beam gain to cell-edge UEs. In summary, in different scenarios, the relationship between CQI/location and beamforming gain will change, so such relationship cannot be used to decide the transmission modes, especially to decide beamforming mode. Further, the known mechanisms are not accurate enough as fast fading and spatial characteristics of UEs may change a lot over time which will cause transmission mode selection changes to be effected regularly.

In the event that a wrong transmission mode is allocated, beamforming gain will not be achieved, extra signalling might be required to re-allocate the appropriate mode increasing the signalling overhead and overall reducing system efficiency.

Hence, the basic idea of the present invention is to provide a method being able to provide an adaptive allocation of transmission modes based on determined current capabilities of a UE. For instance, different transmission modes may be allocated to different UE and a base station can thus support more than one transmission mode.

The idea proposes to use information being determined during application of a standard algorithm for compensating the CQI/SINR gap between a UE's feedback and the real channel conditions based on the eNB's (or base station) observations/statistics.

The base station may be any kind of base station or eNodeB (eNB) being able to provide the above mentioned functionalities. The user equipment may be a regular LTE device being able to communicate with the base station.

According to an embodiment of the invention, the transmission mode is indicative for a spatial propagation of radio signals via the communication channel.

According to the Long Term Evolution (LTE) standard for mobile broadband, multi-antenna transmission modes are included that improve performance in terms of coverage, spectral efficiency and peak throughput. These transmission modes, in contrast to a configuration of the communication channel in view of resource allocating, refer to the spatial propagation of radio signals. This may denote the propagation of signals via multiple antennas. This may be called MIMO (multiple-input and multiple-output) being the use of multiple antennas at the transmitter and/or receiver to improve communication performance. Dependent on the capability of the user equipment, different kind of MIMO may be used.

According to a further embodiment of the invention, the transmission mode is indicative for one of the group consisting of transmit diversity, open-loop multiple input multiple output, closed-loop multiple input multiple output, beamforming, dual stream beamforming.

All transmission modes may be based on MIMO technology. Each transmission mode may support specific techniques. In current release 9 of LTE, eight transmission modes are defined. Of course, in further releases, further transmission modes may be specified, which may also fall within the scope of embodiments of the invention.

In Release 9, each user equipment is configured in one of 8 "transmission modes" for PDSCH reception:
Mode 1: Single antenna port, port 0
Mode 2: Transmit diversity
Mode 3: Large-delay CDD
Mode 4: Closed-loop spatial multiplexing
Mode 5: MU-MIMO
Mode 6: Closed-loop spatial multiplexing, single layer
Mode 7: Single antenna port, UE-specific RS (port 5)
Mode 8: Single or dual-layer transmission with UE specific RS (ports 7 and/or 8).

For instance, transmission mode 2 supports SFBC (space frequency block coding) for two antenna ports and SFBC/FSTD (frequency shift time diversity) for four antenna ports.

Transmission mode 3 supports large delay CDD (cyclic delay diversity), may increase frequency selectivity, and may allow open-loop spatial multiplexing. Further transmission mode 3 may be used up to rank 2 without closed loop precoding feedback from the UE.

Transmission mode 4 supports precoding using specified codebook for the relevant number of antenna ports. It may support up to 4 layers. Further, transmission mode 4 uses maximal two codewords to limit signalling overhead. Further, it may support closed-loop precoding feedback from the UE and the used precoding matrix is indicated to the UE on PDCCH.

Transmission mode 5 may be called rank 1 MU-MIMO (multi user MIMO) It is based on same precoding codebooks and feedback as transmission mode 4. Here, the PDCCH indicates the power offset for PDSCH.

Transmission mode 6 is based on transmission mode 4 but might be used for single-layer only.

In transmission mode 7, UE-specific RS (reference symbols) are used. It is suitable for UE-specific beamforming, e.g. based on angle of arrival (no closed-loop precoding feedback from the UE). This mode may provide some beamforming gain.

Transmission mode 8 uses dual-layer UE-specific RS. Further, closed-loop precoding feedback may or may not be used. This mode supports dual-layer SU-MIMO (single user MIMO) and single-layer MU-MIMO.

In some cases (dependent on the UE), in transmission modes 7 and 8, besides no beamforming gain is achieved, additional overhead of DM-RS may also lead to loss of overall spectrum efficiency. Thus, some user equipments may be not suitable to be operated in transmission modes 7 and 8.

According to the herein described embodiments, the capabilities of a UE, which may change over time, may be considered when determining a transmission mode for the UE.

According to a further embodiment of the invention, the compensation value is determined during on an outer loop link adaptation (OLLA).

The OLLA algorithm may be used to compensate the CQI/SINR gap between UE's feedback and real channel condition based on eNB's observation/statistics. Such gap includes some system error, e.g. feedback delay, CQI quantization error, etc. The OLLA algorithm determines a compensation value, i.e. an offset, for compensating this gap. The CQI compensation will be like CQI_New= CQI_Feedback−OLLA_Offset.

The eNB may set an initial value for OLLA-offset and afterwards close-loop iterative operation of OLLA will make the OLLA-offset converge. For example assuming OLLA-offset initial value is zeros: then at the beginning phase, the real channel condition may be better than the CQI which UE feeds back. In this case, ACK will occur with much higher probability then NACK, so the OLLA_Offset might keep at one negative level, e.g. −5 or −3. Based on such information, the appropriate transmission mode may be chosen according to embodiments of the invention.

According to a further embodiment of the invention, an initial transmission mode is allocated to the user equipment before determining the adapted transmission mode.

Before determining the appropriate transmission mode, the communication between base station (eNB) and UE may start with an initial transmission mode, for example TM1 or TM7. Afterwards, when information about the channel quality has been determined during the OLLA algorithm, another transmission mode may be selected and allocated.

According to a further embodiment of the invention, the initial transmission mode is indicative for beamforming.

According to this embodiment, the communication starts with the beamforming transmission mode, i.e. TM7. Beamforming is a signal processing technique used for directional signal transmission or reception. This is achieved by combining elements in the array in a way where signals at particular angles experience constructive interference while others experience destructive interference. Beamforming can be used at both the transmitting and receiving ends in order to achieve spatial selectivity.

According to a further embodiment of the invention, allocating the adapted transmission mode to the user equipment comprises allocating a new transmission mode to the user equipment or maintaining the initial transmission mode of the user equipment.

When, based on the determined compensation value, it is determined that the initial transmission mode is the appropriate or best transmission mode in this case, the initial transmission mode may be maintained. Otherwise, another transmission mode may be selected based on the compensation value and other information, for example a lookup table comprising an allocation of compensation value and transmission mode.

According to a further embodiment of the invention, determining an adapted transmission mode for the user equipment based on the compensation value comprises determining an absolute value of the compensation value, and/or determining an average value of the compensation value.

Before allocating the transmission mode, the compensation value, i.e. the OLLA offset, may be analyzed in view of the absolute value and an average value over time. Based on this information, the appropriate transmission mode may be selected. An allocation or correlation between transmission mode and absolute value/average value may be predefined, for instance, and may be stored in a database, like a lookup table.

When the absolute value is high, for example 4 or higher, the transmission mode 7 may be suitable, i.e. beamforming. For a low absolute value, i.e. for example 1 or lower, beamforming as transmission mode might be not suitable. For a positive average value and a high absolute value, which may be for example high speed UEs or UEs with a bad channel condition, TM2, 3 or 4 may be suitable. Thus, this embodiment may lead to a change from a transmission mode comprising beamforming to a transmission mode without beamforming or to a change from a transmission mode without beamforming to a transmission mode comprising beamforming, depending on the absolute and/or average values.

According to a further embodiment of the invention, if the absolute value is above a predetermined threshold and the average value is negative, an initial transmission mode of the user equipment is maintained during allocating the adapted transmission mode to the user equipment.

If the absolute value is high, for example 4 or higher, the initial transmission mode may be appropriate. This may be the case in particular when the initial transmission mode comprises beamforming, i.e. for example TM7.

According to a further embodiment of the invention, if the absolute value is below a predetermined threshold or if the absolute value is above a predetermined threshold and the average value is positive, a new transmission mode is allocated to the user equipment during allocating the adapted transmission mode to the user equipment.

For example, for a low absolute value, i.e. for example 1 or lower, beamforming as transmission mode might be not suitable. For a positive average value and a high absolute value, which may be for example high speed UEs or UEs with a bad channel condition, TM2, 3 or 4 may be suitable. Thus, in particular when the initial transmission mode comprises beamforming, for example TM7, a new transmission mode may be allocated to the communication between user equipment and base station.

According to a second aspect of the invention, a base station is provided for allocating a transmission mode to a user equipment for a radio transmission within a cellular network between the user equipment and the base station, wherein the user equipment is adapted to communicate with the base station in the allocated transmission mode via a communication channel. The base station comprises a determination unit being adapted to determine an information being indicative for a quality of the communication channel, a receiving unit being adapted to receive a feedback information from the user equipment being indicative for the quality of the communication channel, and a control unit being adapted to determine a compensation value based on the information and the feedback information, wherein the compensation value is adapted for compensating a difference between the information and the feedback information, to determine an adapted transmission mode for the user equipment based on the compensation value, and to allocate the adapted transmission mode to the user equipment.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting unit, for example a transmitter. The receiver and the transmitter may be implemented as one single unit, for example as a transceiver. The transceiver or the receiving unit and the transmitting unit may be adapted to communicate with a further base station or the user equipment via an antenna.

The control unit and the determination unit may be implemented as single units or may be one unit being implemented for example as part of a standard control unit, like a CPU or a microcontroller.

A user equipment (UE) in the context of this description may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station.

The user equipment may further comprise a transmitting unit for transmitting signal. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

According to a third aspect of the invention, a cellular network system for allocating a transmission mode to a user equipment is provided, wherein the cellular network system comprises a least one base station as described above.

Generally herein, the method and embodiments of the method according to the first aspect may include performing one or more functions described with regard to the second or third aspect or an embodiment thereof. Vice versa, the base station or cellular network system and embodiments thereof according to the second and third aspect may include units or devices for performing one or more functions described with regard to the first aspect or an embodiment thereof.

According to a fourth aspect of the herein disclosed subject-matter, a computer program for allocating a transmission mode to a user equipment, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of allocating a transmission mode to a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

DETAILED DESCRIPTION

The illustration in the drawing is schematically. It is noted that in different figures, similar or identical elements are provided with the same reference signs.

In the following, embodiments of the herein disclosed subject matter are illustrated with reference to the drawings and reference to aspects of current standards, such as LTE. However, such reference to current standards is only exemplary and should not be considered as limiting the scope of the claims.

Figure 1:
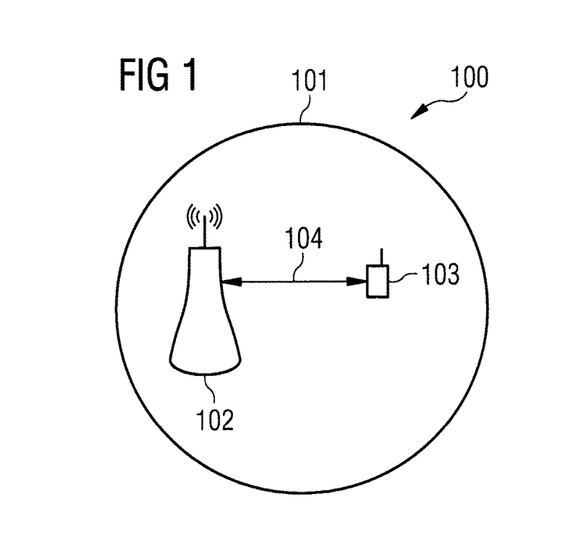
FIG. 1 shows a cellular network system according to an exemplary embodiment of the invention.

FIG. 1 shows a cellular network system 100 according to an exemplary embodiment. The cellular network system comprises at least one cell 101. A base station 102 is assigned to this cell. A user equipment 103 is served by the base station.

At the beginning of the communication, the user equipment (UE) and the base station (eNB) communicate with each other based on an initial transmission mode. During an OLLA algorithm as known in the art, the base station determines an information being indicative for a quality of the communication channel, for example based on statistics. Then, the base station receives a feedback information from the user equipment being indicative for the quality of the communication channel on the UE side. According to the OLLA algorithm, a compensation value (OLLA offset) is determined based on the information and the feedback information, wherein the compensation value is adapted for compensating a difference between the information and the feedback information. Subsequently, an adapted transmission mode for the user equipment may be determined based on the compensation value and the adapted transmission mode may be allocated to the user equipment.

The transmission mode is indicative for a spatial propagation of radio signals via the communication channel and may correspond to one of the transmission modes as defined in LTE Release 8 and 9. The transmission mode may be for example transmit diversity, open-loop multiple input multiple output, closed-loop multiple input multiple output, beamforming, dual stream beamforming.

Figure 5:
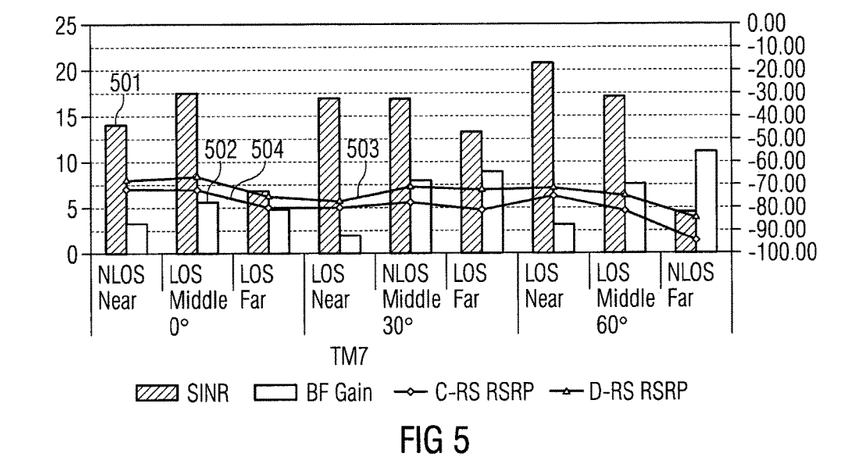
FIG. 5 shows a comparison of CQI and beamforming gain.

There exist some discussions about how to decide which transmission mode should be allocated, for example CQI based criterion and location based criterion. In the CQI based criterion, when CQI is smaller than a threshold, beamforming gain can help UE so TM7 might be recommended; when CQI is equal or greater than a threshold, multiple layer codebook-based precoding can achieve better spectrum efficiency by sending more than one data stream (TM7 can only support one stream). In the location based criterion, a cell-edge UE will obtain most obvious performance enhancement from beamforming; however cell-center UEs who have already very high SINR, the additional beamforming gain cannot be proportionally reflected into throughput based on Shannon theory. However, it may be seen that there is no direct relationship between CQI/location and beamforming gain. This is shown in FIG. 5, wherein 501 shows the SINR for no-line-of-sight (NLOS) UEs and line-of-sight (LOS) UEs for different locations. 502 shows the beamforming gain. There seems to be no relationship between these factors. Further, 503 shows the D-RS RSRP and 504 the C-RS RSRP.

In summary, in different scenarios, the relationship between CQI/location and beamforming gain will change, so such relationship cannot be used to decide the transmission modes, especially to decide beamforming mode.

According to the method as described herein, UEs in different scenarios can be reflected or differentiated via OLLA offset at eNB side. The basic function of OLLA is to compensate the CQI/SINR gap between UE's feedback and real channel condition based on eNB's observation/statistics. Such gap includes some system error, e.g. feedback delay, CQI quantization error, etc. And the CQI compensation will be like CQI_New=CQI_Feedback−OLLA_Offset.

For beamforming UEs, the feedback from UEs might only be based on CRS, which doesn't cover any beamforming gain; eNB will set on initial value for OLLA-offset and afterwards close-loop iterative operation of OLLA will make the OLLA-offset converge.

For example assuming OLLA-offset initial value is zeros. Then at the beginning phase, because there exists beamforming gain, so the real channel condition will be better than the CQI which UE feeds back. So ACK will occur with much higher probability then NACK, so the OLLA_Offset will keep at one negative level, e.g. −5 or −3. Those UEs with small absolute value of OLLA offset, e.g. −0.5, −0.3 etc, might be not suitable to work in beamforming mode, because the DM-RS overhead may be 5% around. On the opposite, those UEs with high absolute value of OLLA offset, e.g. −5, −7 etc, may be suitable for beamforming transmission mode.

Another application for OLLA offset may be to differentiate high speed UEs. For most of the TD-LTE operators, high speed UE performance is very critical for both advertizing and realistic operation. Since now, there is no speed information designed in signaling feedback from UE to eNB, so it might be helpful, if an eNB can find which UEs are high speed UEs and add some corresponding enhancement (e.g. conservative MIMO mode selection).

The base that OLLA offset can help to find high speed UEs is as follows: in high speed scenario, channel state condition changes dynamically, so the OLLA at eNB will be always tracking such channel fluctuation. And there will be more NACK in high speed scenario than in low speed scenario with all the other conditions the same. So, the OLLA offset may be for instance be positive, e.g. 3.0, 6.0 etc, so that the updated CQI CQI_New at eNB will be lower than UE's feedback so as to satisfy target BLER (block error ratio).

For example, the following criteria may be used for selecting a transmission mode:
UE with negative average OLLA offset with high absolute value (e.g. −7, −5) might be suitable for beamforming (TM7)
UE with low absolute value (0.3, −1.0) might not be suitable for beamforming
UE with positive average OLLA offset with high absolute value (e.g. 4, 6) may be high speed UEs or UEs in really bad channel condition and therefore suitable for TM2/3/4.

Figure 2:
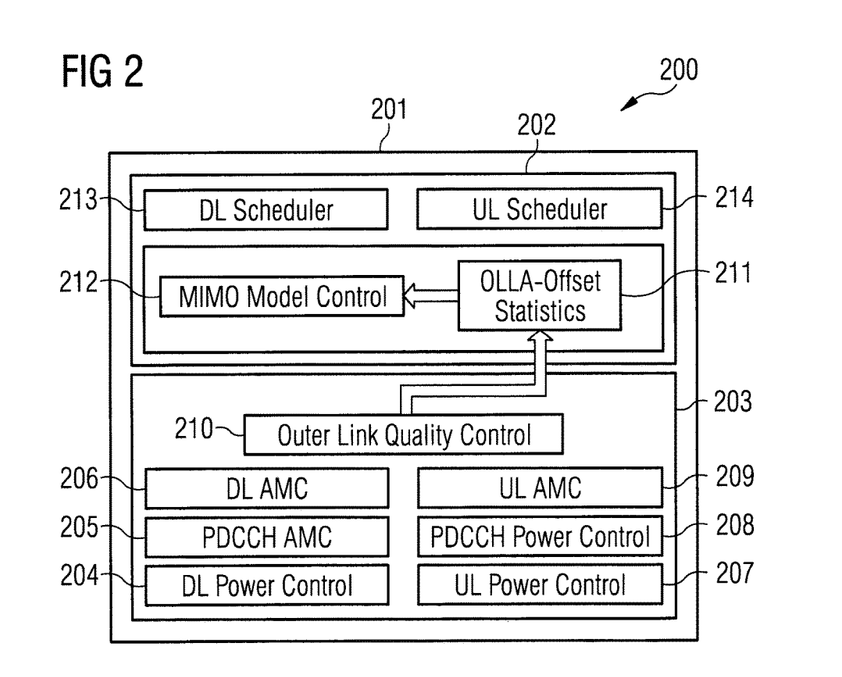
FIG. 2 shows a framework of radio resource management according to an exemplary embodiment of the invention.

FIG. 2 shows a framework 200 of L1/L2 radio resource management (RRM) which may be used for the described method and system. The framework comprises an RRM unit 201 which comprises two main parts, the scheduler 202 and the link quality control/link adaptation unit 203. The link quality control/link adaptation unit comprises some standard units DL power control 204, PDCCH AMC 205, DL AMC 206, UL power control 207, PDCCH power control 208, UL AMC 209 and outer link quality control 210. The scheduler also comprises some standard units MIMO model control 212, DL scheduler 213 and UL scheduler 214. The scheduler comprises further a unit called OLLA offset statistics 211.

The per-UE based OLLA offset will be shared from the unit "Outer link quality control" 210 to the unit "OLLA-offset statistics" 211 per TTI for all the UEs (may be only for scheduled UEs). The unit "OLLA-offset statistics" may carry out the averaging of the OLLA-offset for each UE in time domain, so as to achieve the statistically mean OLLA offset. Such kinds of averaging can be implemented via either FIR filter or IIR filter. IIR filter may be used for instance because no additional memory for storage is needed, and the filter coefficient can adjust the length of averaging window very flexibly. The filtered average OLLA-offset for different UEs is sent to the unit "MIMO Mode Control" 212 for final transmission mode selection.

Figure 3:
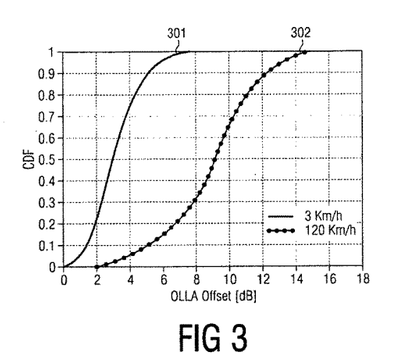
FIG. 3 shows an OLLA distribution of 3 km/h and 120 km/h separately when all UEs have the same speed
Figure 4:
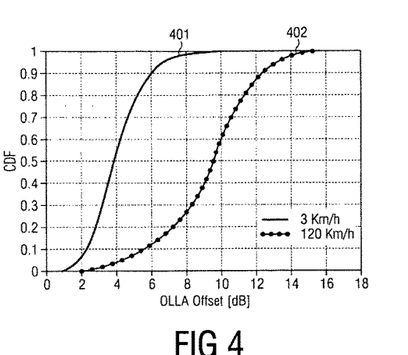
FIG. 4 shows an OLLA distribution of 3 km/h UEs and 120 km/h UEs when half UEs are 3 km/h and another half UEs are 120 km/h.

FIGS. 3 and 4 show some simulation results. FIG. 3 shows the OLLA distribution of 3 km/h (301) and 120 km/h (302) separately when all the UEs have the same speed. FIG. 4 shows the OLLA distribution of 3 km/h UEs (401) and 120 km/h UEs (402) when half UEs are 3 km/h and another half UEs are 120 km/h. It may be seen that the described method and system can be used to differentiate UE speed.

Figure 6:
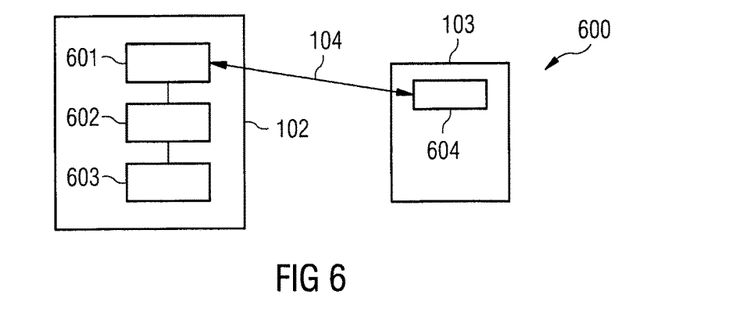
FIG. 6 shows a base station and a user equipment within a cellular network system according to an exemplary embodiment of the invention.

FIG. 6 shows a cellular network system 600 according to an exemplary embodiment of the invention. The cellular network system comprises a base station 102 and a user equipment 103.

The base station 102 may be any type of access point or point of attachment, which is capable of providing a wireless access to a telecommunication network. Thereby, the wireless access may be provided for a user equipment 103 or for any other network element, which is capable of communicating in a wireless manner.

The base station comprises a receiver as known by a skilled person. The base station may also comprise a transmitter. The receiver and the transmitter may be implemented as one single unit, for example as a transceiver 601 as shown in FIG. 6. The transceiver or the receiving unit and the transmitter may be adapted to communicate with a further base station (not shown) or the user equipment 103 via an antenna.

The base station 102 comprises further a determination unit 602. The determination unit may be implemented for example as part of a standard control unit, like a CPU or a microcontroller, or may be implemented as a single unit.

The determination unit may be adapted to determine an information being indicative for a quality of the communication channel (from the base station side), for example based on statistics. The receiving unit receives a feedback information from the user equipment being indicative for the quality of the communication channel (from the UE side).

The base station comprises further a control unit 603 being adapted to determine a compensation value based on the information and the feedback information, wherein the compensation value is adapted for compensating a difference between the information and the feedback information. The control unit may be further adapted to determine an adapted transmission mode for the user equipment based on the compensation value and to allocate the adapted transmission mode to the user equipment.

The control unit and the determination unit may be part of one integrated unit or may single units. They may also be part of a common control unit of the base station.

The user equipment (UE) 103 may be any type of communication end device, which is capable of connecting with the described base station. The UE may be in particular a cellular mobile phone, a Personal Digital Assistant (PDA), a notebook computer, a printer and/or any other movable communication device.

The user equipment 103 may comprise a transceiver 604 for transmitting and/or receiving signals to/from the base station 102. The transceiver may comprise a transmitting unit and a receiving unit. The transmitting unit may be a transmitter as known by a skilled person, and the receiving unit may be a common known receiver. The transceiver or the receiving and the transmitting unit may be adapted to communicate with the base station via an antenna.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that abase station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the configuration unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Cell of a cellular network system
102 Base station
103 User equipment
200 RRM framework
201 RRM unit
202 Scheduler
203 Link quality control/link adaptation unit
204 DL power control
205 PDCCH AMC
206 DL AMC
207 UL power control
208 PDCCH power control
209 UL AMC
210 Outer link quality control
211 OLLA offset statistics
212 MIMO model control
213 DL scheduler
214 UL scheduler
301 OLLA distribution for all user equipments having 3 km/h
302 OLLA distribution for all user equipments having 120 km/h
401 OLLA distribution for some user equipments having 3 km/h
402 OLLA distribution for some user equipments having 120 km/h
501 SINR
502 Beamforming gain
503 C-RS RSRP
504 D-RS RSRP
600 Cellular network system
601 Transceiver of base station
602 Determination unit of base station
603 Control unit of base station
604 Transceiver of user equipment

What is claimed is:

1. A method comprising:
   determining, by a base station, channel quality identifier (CQI)/signal interference to noise ratio (SINR) information indicative of the quality of the communication channel between the base station and a user equipment;
   receiving, by the base station, feedback CQI/SINR information from the user equipment indicative of the quality of the communication channel determined by the user equipment;
   using an outer loop link adaptation (OLLA) algorithm to determine a compensation value based on the CQI/SINR information and the feedback CQI/SINR information, wherein the compensation value is an OLLA offset for compensating for a difference between the CQI/SINR information and the feedback CQI/SINR information;
   determining an adapted transmission mode for the user equipment based on the compensation value; and
   allocating the adapted transmission mode to the user equipment.

2. The method as set forth in claim 1, wherein the adapted transmission mode is indicative of a spatial propagation of radio signals via the communication channel.

3. The method as set forth in claim 1, wherein the adapted transmission mode is indicative of one of the group consisting of:
   transmit diversity, open-loop multiple input multiple output, closed-loop multiple input multiple output, beamforming, and dual stream beamforming.

4. The method as set forth in claim 1, wherein an initial transmission mode is allocated to the user equipment before determining the adapted transmission mode.

5. The method as set forth in claim 4, wherein the initial transmission mode is indicative of beamforming.

6. The method as set forth in claim 4, wherein allocating the adapted transmission mode to the user equipment comprises one of:
   allocating a new transmission mode to the user equipment; and maintaining the initial transmission mode of the user equipment.

7. The method as set forth in claim 1, wherein determining an adapted transmission mode for the user equipment based on the compensation value comprises at least one of determining an absolute value of the compensation value, and determining an average value of the compensation value.

8. The method as set forth in claim 7, wherein, when the absolute value is above a predetermined threshold and the average value is negative, an initial transmission mode of the user equipment is maintained during allocating the adapted transmission mode to the user equipment.

9. The method as set forth in claim 7, wherein, when the absolute value is below a predetermined threshold or when the absolute value is above a predetermined threshold and the average value is positive, a new transmission mode is allocated to the user equipment during allocating the adapted transmission mode to the user equipment.

10. An apparatus comprising: at least one processor; and at least one memory including computer program code, the at least one memory and the computer program code configured, with the at least one processor, to cause the apparatus to:
   determine channel quality identifier (CQI)/signal interference to noise ratio (SINR) information indicative of the quality of the communication channel between the base station and a user equipment;
   receive feedback CQI/SINR information from the user equipment indicative of the quality of the communication channel determined by the user equipment;

use an outer loop link adaptation (OLLA) algorithm to determine a compensation value based on the CQI/SINR information and the feedback CQI/SINR information, wherein the compensation value is an OLLA offset for compensating for a difference between the CQI/SINR information and the feedback CQI/SINR information;

determine an adapted transmission mode for the user equipment based on the compensation value; and allocate the adapted transmission mode to the user equipment.

11. A cellular network system comprising at least one apparatus as set forth in claim 10.

12. A computer program product comprising a non-transitory computer-readable storage medium bearing computer program code embodied therein for use with a computer, the computer program code comprising code for performing:

determining, by a base station, channel quality identifier (CQI)/signal interference to noise ratio (SINR) information indicative of the quality of the communication channel between the base station and a user equipment;

receiving, by the base station, feedback CQI/SINR information from the user equipment indicative of the quality of the communication channel determined by the user equipment;

using an outer loop link adaptation (OLLA) algorithm to determine a compensation value based on the CQI/SINR information and the feedback CQI/SINR information, wherein the compensation value is an OLLA offset for compensating for a difference between the CQI/SINR information and the feedback CQI/SINR information;

determining an adapted transmission mode for the user equipment based on the compensation value; and allocating the adapted transmission mode to the user equipment.

* * * * *